(12) United States Patent
Gopal Samy et al.

(10) Patent No.: US 12,457,946 B2
(45) Date of Patent: Nov. 4, 2025

(54) SYSTEMS AND METHODS FOR AUTONOMOUS MONITORING AND/OR OPTIMIZATION OF PLANT GROWTH

(71) Applicant: SIGNIFY HOLDING B.V., Eindhoven (NL)

(72) Inventors: Mathan Kumar Gopal Samy, Medford, MA (US); Peter Deixler, Arlington, MA (US); Tharakesavulu Vangalapat, Quincy, MA (US); Jaehan Koh, Chestnuthill, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 286 days.

(21) Appl. No.: 17/777,406

(22) PCT Filed: Nov. 9, 2020

(86) PCT No.: PCT/EP2020/081522
§ 371 (c)(1),
(2) Date: May 17, 2022

(87) PCT Pub. No.: WO2021/099167
PCT Pub. Date: May 27, 2021

(65) Prior Publication Data
US 2022/0400634 A1    Dec. 22, 2022

Related U.S. Application Data

(60) Provisional application No. 62/937,551, filed on Nov. 19, 2019.

(30) Foreign Application Priority Data

Dec. 3, 2019  (EP) .................................... 19213206

(51) Int. Cl.
*A01G 25/16* (2006.01)
*A01G 7/04* (2006.01)
(Continued)

(52) U.S. Cl.
CPC ........... *A01G 25/167* (2013.01); *A01G 7/045* (2013.01); *G05B 19/042* (2013.01); *G05B 2219/2625* (2013.01)

(58) Field of Classification Search
CPC ... A01G 9/04; A01G 9/26; A01G 9/24; A01G 25/167; A01G 9/249; A01G 7/045
See application file for complete search history.

(56) References Cited

U.S. PATENT DOCUMENTS 9,638,678 B2 * 5/2017 Shriver .................. G06F 18/22
9,913,429 B1    3/2018 Stubbs et al.
(Continued)

FOREIGN PATENT DOCUMENTS

WO    2019157598 A1    8/2019

*Primary Examiner* — Joshua D Huson
*Assistant Examiner* — Spencer T Callaway

(57) ABSTRACT

A system for autonomous monitoring and/or optimization of plant (140) growth is provided. The system may include actuation devices configured to interact with an agricultural area (120), image sensors (130) configured to capture images (170) of a plant (140) in the agricultural area (120), and a processor (150) in communication with the image sensors (130) and the actuation devices. The processor (150) may be configured to store, via a memory (160), a first image (170) of the agricultural area (120) captured prior to a first actuation of the actuation devices; and trigger, synchronously with the first actuation, the image sensors (130) to capture a second image (180) of the agricultural area (120). The processor (150) may be further configured to detect features of the plant (140) in the first and second images (170) of the agricultural area (120); evaluate the detected features of the plant (140) for visual plant qualities (210);

(Continued)

and dynamically set one or more parameters (190) of the actuation devices based on the visual plant qualities (210).

13 Claims, 7 Drawing Sheets

(51) Int. Cl.
*G05B 19/042* (2006.01)
*A01G 9/24* (2006.01)
*G06Q 10/04* (2023.01)
*G06Q 10/063* (2023.01)
*G06Q 50/02* (2024.01)

(56) References Cited

U.S. PATENT DOCUMENTS

| | | | |
|---|---|---|---|
| 2017/0034986 A1* | 2/2017 | Koch | A01G 7/00 |
| 2017/0243340 A1* | 8/2017 | Itzhaky | G06T 7/90 |
| 2017/0332544 A1 | 11/2017 | Conrad et al. | |
| 2018/0082412 A1* | 3/2018 | Greenberg | G06T 7/0002 |
| 2018/0220592 A1* | 8/2018 | Gilley | A01G 9/24 |
| 2018/0271029 A1 | 9/2018 | Hatamian | |
| 2018/0359976 A1 | 12/2018 | Millar et al. | |
| 2019/0059202 A1 | 2/2019 | Lorek | |
| 2019/0075732 A1* | 3/2019 | Gowa | A01B 69/008 |
| 2019/0075741 A1* | 3/2019 | Olesen | A01G 31/06 |
| 2019/0200535 A1* | 7/2019 | Regan | A01G 7/00 |
| 2019/0259108 A1 | 8/2019 | Bongartz et al. | |
| 2019/0364743 A1* | 12/2019 | Lys | A01G 7/045 |

\* cited by examiner

SYSTEMS AND METHODS FOR AUTONOMOUS MONITORING AND/OR OPTIMIZATION OF PLANT GROWTH

CROSS-REFERENCE TO PRIOR APPLICATIONS

This application is the U.S. National Phase application under 35 U.S.C. § 371 of International Application No. PCT/EP2020/081522, filed on Nov. 9, 2020, which claims the benefits of European Patent Application No. 19213206.6, filed on Dec. 3, 2019 and U.S. Application No. 62/937,551, filed Nov. 19, 2019. These applications are hereby incorporated by reference herein.

FIELD OF THE DISCLOSURE

The present disclosure is directed generally to systems and methods for autonomous monitoring and/or optimization of plant growth.

BACKGROUND

The world population is expected to reach 9.8 billion by 2050, 68% of which will be living in urban areas. While the need for food is on the rise, agricultural land area dwindles due to urbanization and climate change. As a result, most of the urban population has little or no access to fresh and healthy produce nearby. Indoor farming is quickly becoming a preferred and efficient way to produce more food with fewer resources than conventional farming, without being dependent on arable land availability and external climate conditions.

According to a 2017 market report, labor accounts for 56% of operational expenses in vertical farms. On average, a vertical farm requires 63 laborers per acre, whereas greenhouses need only 3. In vertical farms, when not carefully screened upon every entry, laborers may be carriers of contamination. Accordingly, a greater degree of automation in the vertical farming industry is needed to reduce labor cost and risk of contamination.

SUMMARY OF THE DISCLOSURE

The present disclosure is directed to inventive systems and methods for performing autonomous monitoring and/or optimization of plant growth, for example, by analyzing images and other data captured in an agricultural area before and after an actuation of an actuation device. Based on the analysis, the actuation device is dynamically set to provide conditions to improve plant growth. In some examples, the actuation devices may be set to provide mist via an irrigation system, light via a lighting system, and/or air flow via e.g. a fan. Further, if the system is unable to capture the plant or specific features of the plant in an image, the actuation devices may be dynamically set to aid in capturing the images. In one example, the lighting provided by the lighting system may be adjusted such that the plant is more visible in subsequently captured images.

The invention is defined by the independent claims and the corresponding depending claims.

Generally, in one aspect, a system for autonomous monitoring and/or optimization of plant growth is provided. The system may include one or more actuation devices configured to interact with an agricultural area. The system may further include one or more image sensors configured to capture images of a plant in the agricultural area.

The system may further include a processor in communication with the one or more image sensors. The processor may also be in communication with the one or more actuation devices. The processor may be configured to store, via a memory, a first image of the agricultural area captured prior to a first actuation of the one or more actuation devices by the one or more image sensors. The processor may be further configured to trigger, within a predetermined period following the first actuation, the one or more image sensors to capture a second image of the agricultural area. The processor may be further configured to detect one or more features of the plant in the first and second images of the agricultural area. The processor may be further configured to evaluate the detected one or more features of the plant for one or more visual plant qualities.

The term "synchronously with the first actuation", as used in the present application, may mean within a predetermined period following the first actuation, wherein the predetermined period may be e.g. at most 1 minute, at most 30 seconds, or at most 1 second.

According to an example, the processor may be further configured to determine if the plant is present in the first and second images of the agricultural area. The processor may be further configured to dynamically set one or more parameters of the one or more actuation devices if the plant is not present in the first and second images.

According to an example, the processor may be further configured to determine if one or more features of the plant are visible in the first and second images of the agricultural area. The processor may be further configured to dynamically set one or more parameters of the one or more actuation devices if the one or more features of plant are not present in the first and second images.

According to an example, as partly mentioned, the processor may be further configured to detect one or more features of the plant in the first and second images of the agricultural area. The processor may be further configured to evaluate the detected one or more features of the plant for one or more visual plant qualities. The processor may be further configured to dynamically set one or more parameters of the one or more actuation devices based on the one or more visual plant qualities.

According to an example, the one or more visual plant qualities may not be visible on the detected one or more features of the plant in the first image.

As it is already mentioned that if the system is unable to capture the plant or specific features of the plant in an image, the actuation device may be dynamically set to aid in capturing the images. This may similarly apply if the system is unable to capture the plant or specific features of the plant in an image, the first actuation of the actuation device may aid in capturing the images, and in particular the one or more visual plant qualities on the detected one or more features of the plant in the first image. The first actuation may in aspects be unrelated or independent to the timing of the one or more image sensors, e.g. a first actuation may occur independently anyhow, e.g. a scheduled misting. For example, in a non-limiting example: a fungus on a leave may not be visible on the first image, but the processor may trigger the one or more image sensors within a predetermined period following said first actuation to capture a second image, which first actuation may e.g. be a scheduled misting independent from the image capturing of the one or more image sensors, so as to aid the determining of the fungus on the leave in the second image. Since the mist may deflect the leave, and therefore the fungus may become more visible. Similar examples may be envisioned.

According to an example, the first actuation may be scheduled. According to an example, the first actuation may be independent from the one or more image sensors capturing the first image, and the processor storing the first image via the memory.

According to an example, the system may further include one or more environmental sensors configured to capture environmental data in the agricultural area. The environmental sensors may include one or more electrochemical soil monitoring sensors. The processor may be further configured to store, via the memory, a first environmental dataset captured in the agricultural area prior to the first actuation of the one or more actuation devices. The processor may be further configured to trigger, synchronously with the first actuation, the one or more environmental sensors to capture a second environmental dataset in the agricultural area. The processor may be further configured to evaluate the first and second environmental datasets for one or more environmental qualities. The dynamic setting of the one or more parameters may be further based on the one or more environmental qualities.

According to an example, the processor may be further configured to identify the location of the one or more features of the plant in the first and second images. The evaluation of the one or more features of the plant may be further based on the location of the one or more features of the plant.

According to an example, the processor may be further configured to trigger the one or more image sensors to capture the second image of the agricultural area within a predetermined (or scheduled) period following the first actuation.

According to an example, the image sensors may include one or more red-green-blue (RGB) sensors. The image sensors may include one or more multi-spectral sensors.

According to an example, the actuation devices may include one or more lighting systems. The actuation devices may include one or more irrigation systems.

Generally, in another aspect a method for autonomous monitoring and/or optimization of plant growth is provided. The method may include retrieving, from a memory, via a processor, a first image of the agricultural area captured prior to a first actuation of one or more actuation devices. The method may include triggering, via the processor, synchronously with the first actuation, the one or more image sensors to capture a second image of the agricultural area. The method may include detecting, via the processor, one or more features of a plant in the first and second images of the agricultural area. The method may include evaluating, via the processor, the detected one or more features of the plant for one or more visual plant qualities.

According to an example, the method may further include dynamically setting one or more parameters of the one or more actuation devices based on the one or more visual plant qualities.

According to an example, the method may further include retrieving, from the memory, a first environmental dataset captured in the agricultural area prior to the first actuation of the one or more actuation devices. The method may further include triggering, via the processor, synchronously with the first actuation, the one or more environmental sensors to capture a second environmental dataset in the agricultural area. The method may further include evaluating the first and second environmental datasets for one or more environmental qualities. The method may further include dynamically setting one or more parameters of the one or more actuation devices based on the one or more environmental qualities and/or the one or more visual plant qualities.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to inventive systems and methods for performing autonomous monitoring and/or optimization of plant growth More generally, Applicant has recognized and appreciated that it would be beneficial to provide a system configured to monitor the growth and health of plants within an agricultural area, and to subsequently adjust the conditions of the agricultural area in response to the status of the plants. Applicant has also recognized and appreciated that it would be beneficial to create such a system which adjusts for difficulties in monitoring the plants, such as when portions of a plant are occluded in a captured image to be analyzed.

Figure 1:
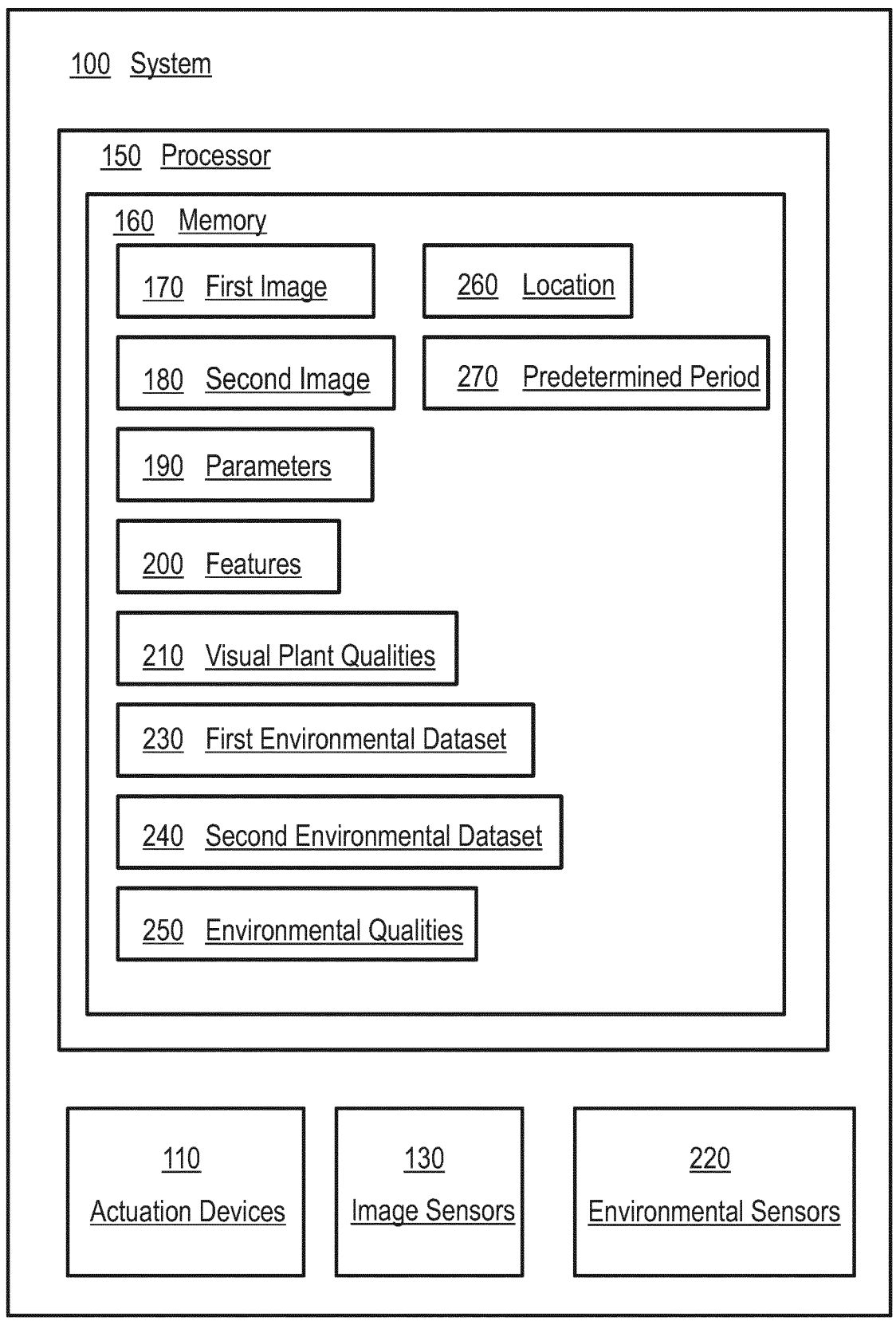
FIG. 1 is a schematic of a system for autonomous monitoring and/or optimization of plant growth, in accordance with an example.
Figure 2:
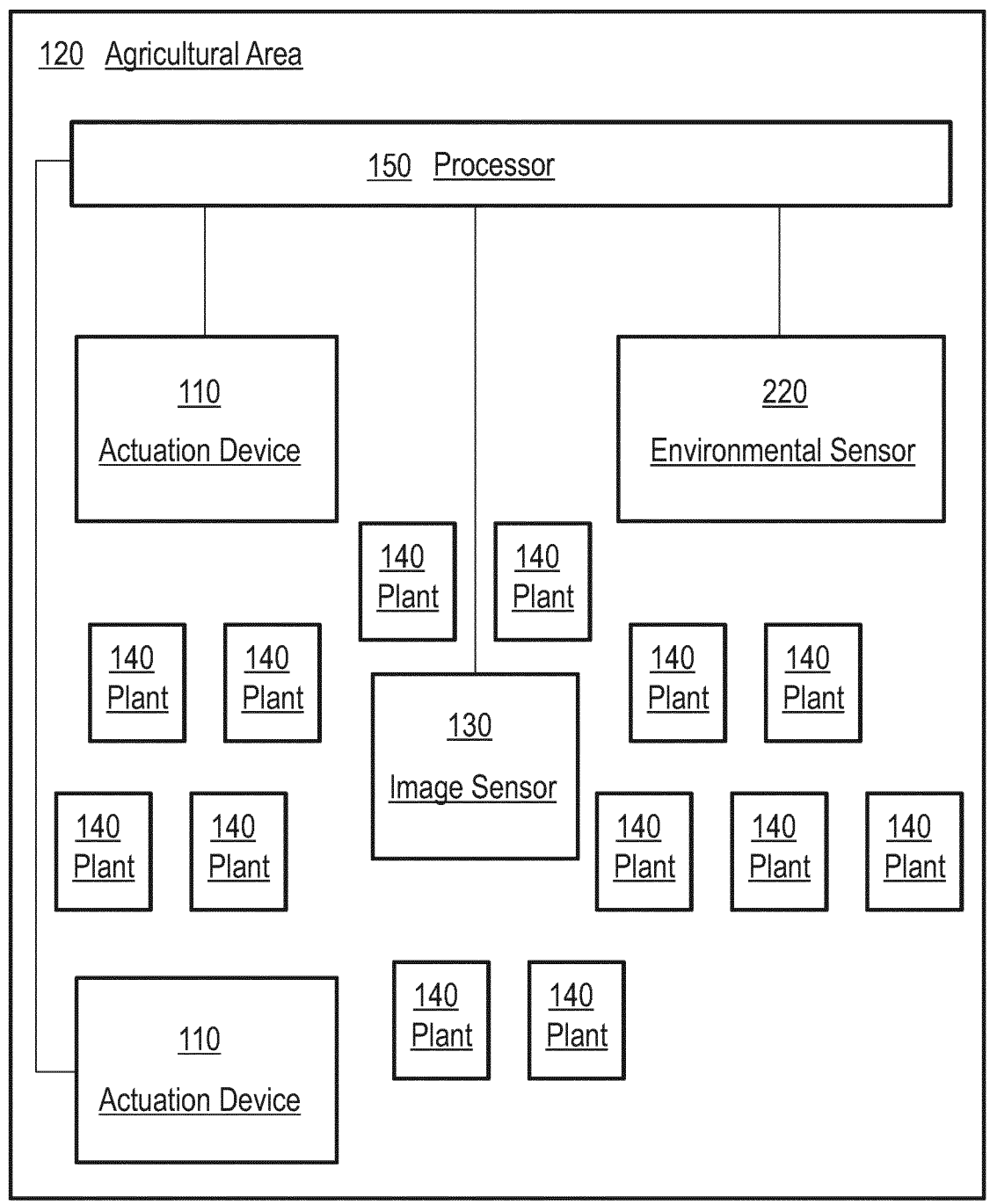
FIG. 2 is a further schematic of a system for autonomous monitoring and/or optimization of plant growth implemented in an agricultural area, in accordance with an example.

Referring to FIGS. 1 and 2, in one aspect, a system 100 for autonomous monitoring and/or optimization of plant growth is provided. The system 100 may include one or more actuation devices 110 configured to interact with an agricultural area 120. The actuation devices 110 may include one or more lighting systems. The lighting system may be configured to control the color, color temperature, intensity, direction, modulation, light scene, light recipe, and/or lighting cycle of one or more luminaires within the agricultural area. The actuation devices 110 may include one or more irrigation systems. The irrigation system may be configured to provide water to one or more portions of the agricultural area 120. The water may be provided in the form of a mist. The actuation devices 110 may be a temperature control system configured set the temperature of one or more portions of the agricultural area 120. The actuation devices 110 may be one or more water spray guns. The actuation devices 110 may be one or more robotic arms configured to move any component of the system, such as the image sensors 130. The actuation devices 110 may be one or more robotic arms configured to interact with the agricultural area 120, including the plants 140 within the agricultural area 120. The actuation devices 110 may be one or more vibrating units. The actuation devices 110 may be one or more audio speakers. The actuation devices 110 may be one or more fans or blowers configured to circulate air through one or more portions of the agricultural area 120. The actuation devices 110 may be any combination of the aforementioned systems and devices.

Figure 3:
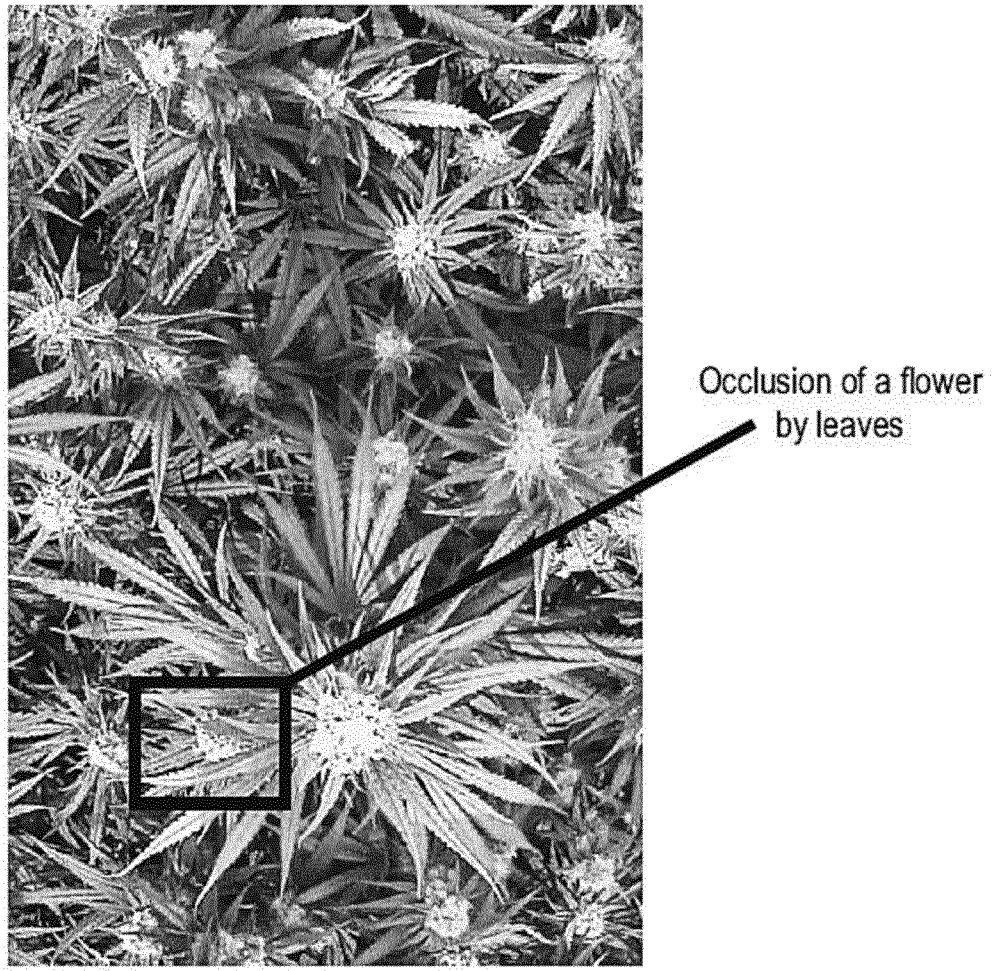
FIG. 3 is an image of an agricultural area as captured by the system, in accordance with an example, showing leaves of a plant occluding a flower.
Figure 4:
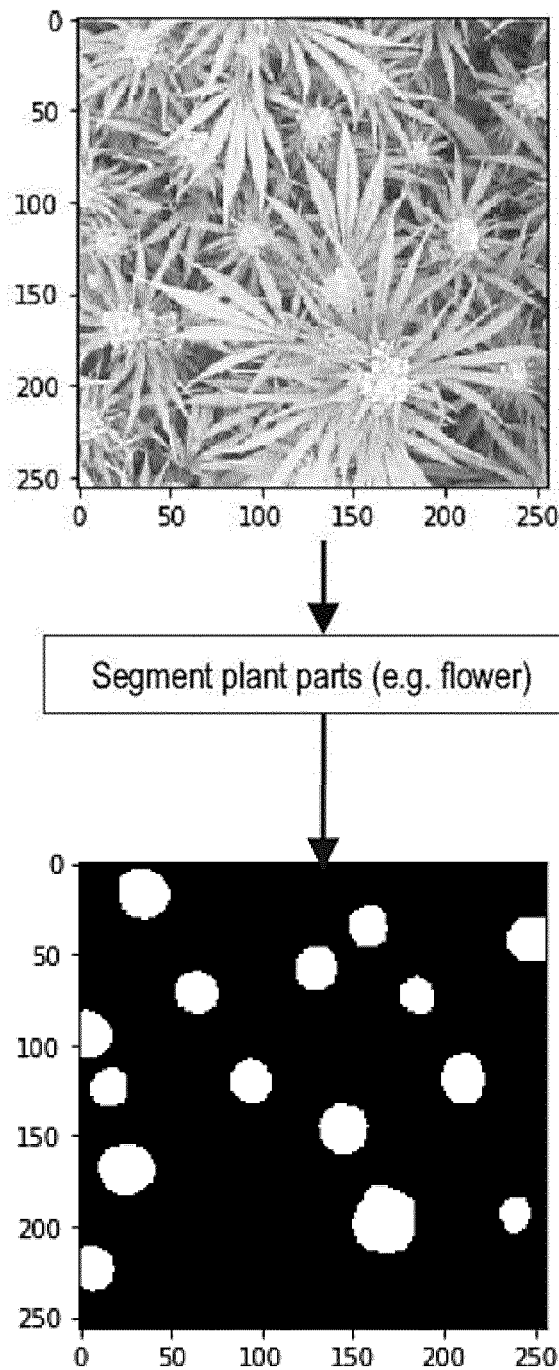
FIG. 4 is an image of an agricultural area processed by a segmentation algorithm.
Figure 5:
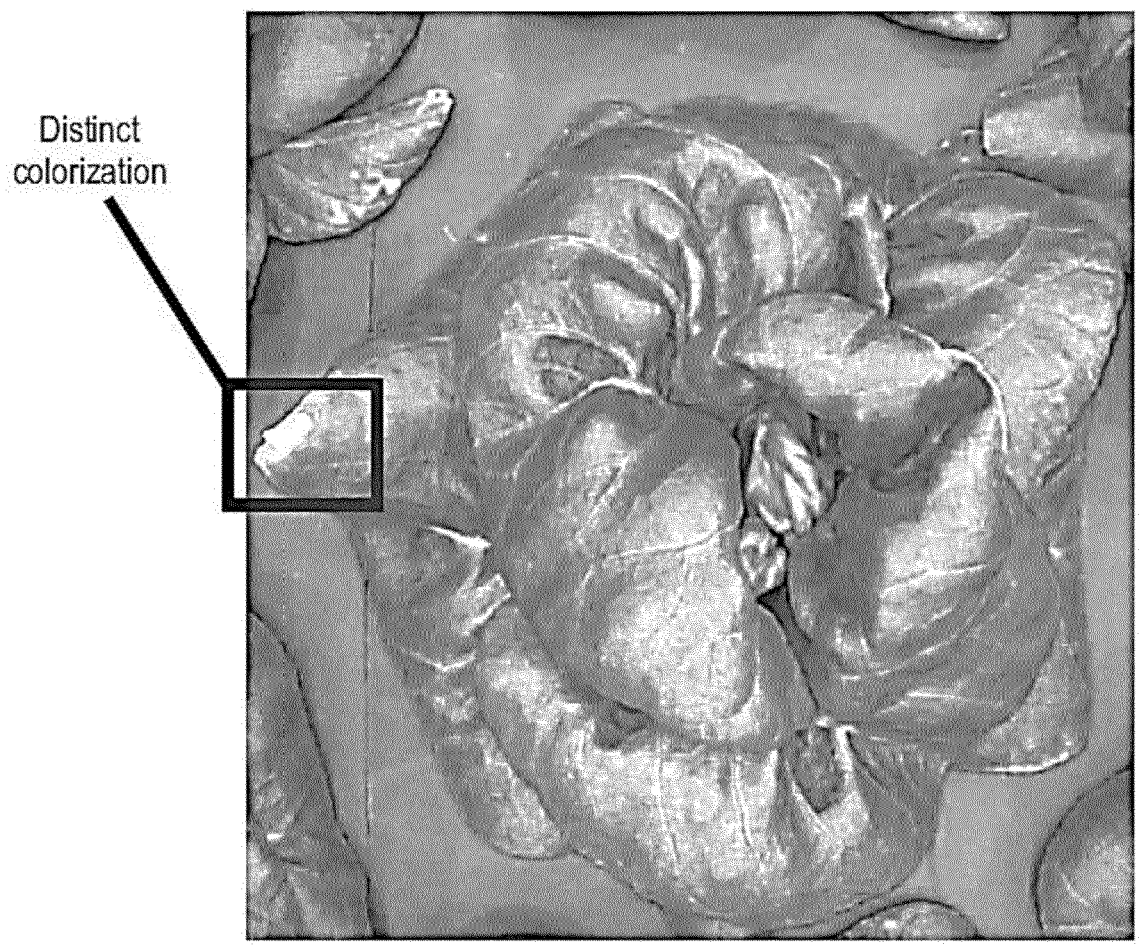
FIG. 5 is an image of a plant demonstrating distinct colorization.

The system 100 may further include one or more image sensors 130 configured to capture images of a plant 140 in the agricultural area 120. According to an example, the image sensors 130 may include one or more red-green-blue (RGB) sensors. The image sensors 130 may include one or more multi-spectral sensors. The image sensors 130 may include one or more time of flight sensors. The image sensors 130 may include any combination of the aforementioned systems and devices. The image sensors 130 may be mounted to mechanical arms, robotic arms, drones, or any other device capable of positioning the image sensor 130 within the agricultural area 120. Examples of images captured by image sensors 130 are shown in FIGS. 3-5.

The system 100 may further include a processor 150 in communication with the one or more image sensors 130. The processor 150 may also be in communication with the one or more actuation devices 110. The processor 150 may be configured to store, via a memory 160, a first image 170 of the agricultural area 120 captured prior to a first actuation of the one or more actuation devices 110. Processor 150 may be capable of executing instructions stored in memory 160 or otherwise processing data to, for example, perform one or more steps of a method. Processor 150 may be formed of one or multiple modules. Processor 150 may take any suitable form, including but not limited to a microprocessor, microcontroller, multiple microcontrollers, circuitry, field programmable gate array (FPGA), application-specific integrated circuit (ASIC), a single processor, or plural processors.

Memory 160 may be a non-transitory medium. Memory 160 can take any suitable form, including a non-volatile memory and/or RAM. The memory 160 may include various memories such as, for example L1, L2, or L3 cache or system memory. As such, the memory 160 may include static random access memory (SRAM), dynamic RAM (DRAM), flash memory, read only memory (ROM), or other similar memory devices.

The processor 150 may be further configured to trigger, synchronously with the first actuation, the one or more image sensors 130 to capture a second image 180 of the agricultural area 120. As described in greater detail below, the processor 150 may then subsequently compare the second image 180 to the first image 170 to evaluate the plant 140.

According to an example, the processor 150 may be further configured to trigger the one or more image sensors 130 to capture the second image 180 of the agricultural area 120 within a predetermined (or scheduled) period 270 following the first actuation. The predetermined (or scheduled) period 270 may be set automatically through the optimization process. The predetermined (or scheduled) period 270 may be stored in memory 160. The predetermined (or scheduled) period 270 may be programmed by a user via a user interface. The user interface may include one or more devices for enabling communication with a user. The user interface can be any device or system that allows information to be conveyed and/or received, and may include a display, a mouse, and/or a keyboard for receiving user commands. In some embodiments, the user interface may include a command line interface or graphical user interface or micro services that may be presented to a remote terminal via communication interface. The user interface may be located with one or more other components of the system, or may located remote from the system and in communication via a wired and/or wireless communications network.

The predetermined period 270 may depend on the type of analysis. For example, if the system 100 is determining whether one or more features 200 of plant 140 are visible in first and second images 170, 180, the predetermined period 270 of time may be a period of seconds, such as 10 seconds. In a further example, if the system 100 is evaluating the growth of plant 140, the predetermined period of time may be a period of hours, such as 10 hours. Further, the predetermined period 270 may depend on the variety of plants 140 grown in the agricultural area 120. Additionally, the predetermined period 270 may depend on the type and characteristics of the image sensors 130 and/or actuation devices 110 used by the system 100. The predetermined period of time 270 may be any length of time appropriate for the present analysis.

According to an example, the processor 150 may be further configured to determine if the plant 140 is present in the first and second images 170, 180 of the agricultural area 120. FIG. 2 shows a number of plants 140 within agricultural area 120 to be detected by the processor 150. The determination of the presence of the plant 140 may be executed using a convolutional neural network implementing a binary classification scheme. Broadly, the binary classification scheme classifies portions (such as individual pixels or groupings of pixels) of the images 170, 180 as containing a plant or not. The neural network may be characterized by a sequence of blocks each consisting of convolutional layers, max pooling layers, and an activation layer. During a training process, the network learns the optimal classification parameters using a large training set of images with and without plants. Users may also supply manually annotated labels for each image as ground truth data.

The processor 150 may be further configured to dynamically set one or more parameters 190 of the one or more actuation devices 110 if the plant 140 is not present in the first and second images 170, 180. For example, the parameters 190 of a lighting system may be set to increase brightness in poorly lit portions of the agricultural area 120.

In a further example, the processor 150 may be configured to determine if the plant 140 is present in the first image 170 of the agricultural area 120, rather than both the first and second images 170, 180. The first image 170 is captured prior to the first actuation of the one or more actuation devices 110. The processor 150 may then be further configured to dynamically set one or more parameters 190 of the one or more actuation devices 110 if the plant 140 is not present in the first image 170. In this configuration, the processor 150 may dynamically set the parameters 190 without requiring the first actuation.

Additionally, in determining the presence of a plant 140 in an agricultural area 120, the processor 150 may be configured to forego the first actuation. In this example, the processor 150 may determine the presence of the plant 140 in the first image 170 and second image 180 without an intervening first actuation in between the capture of the two images 170, 180. The processor 150 may then be further configured to dynamically set one or more parameters 190 of the one or more actuation devices 110 if the plant 140 is not present in the first and/or second images 170, 180.

According to an example, the processor 150 may be further configured to determine if one or more features 200 of the plant 140 are visible in the first and second images 170, 180 of the agricultural area 120. The features 200 of the plant 140 may be, for example, flowers, leaves, nuts, and/or roots. The feature 200 may not be present in the images 170, 180 due to occlusion by other plants 140 or other features 200 of the same plant 140. FIG. 3 shows an example of such occlusion, wherein a flower is occluded by several leaves.

The processor 150 may be further configured to dynamically set one or more parameters 190 of the one or more actuation devices 110 if the one or more features 200 of plant 140 are not present in the first and second images 170, 180. For example, the parameters 190 of a robotic arm may be set to move the leaves of plants 140 to remove an occlusion of one or more flowers. In another example, the parameters 190 of a fan or blower may be set generate an air flow to move the leaves of plants 140 to remove an occlusion of one or more flowers. In a further example, the parameters 190 of a water spray gun may be set generate a water spray to move the leaves of plants 140 to remove an occlusion of one or more flowers.

In a further example, the processor 150 may be configured to determine if one or more features 200 of the plant 140 are visible in the first image 170 of the agricultural area 120, rather than both the first and second images 170, 180. The first image 170 is captured prior to the first actuation of the one or more actuation devices 110. The processor 150 may then be further configured to dynamically set one or more parameters 190 of the one or more actuation devices 110 if the one or more features 200 of the plant 140 are not present in the first image 170. In this configuration, the processor 150 may dynamically set the parameters 190 without requiring the first actuation.

Additionally, in determining the visibility of plant features 200 in the agricultural area 120, the processor 150 may be configured to forego the first actuation. In this example, the processor 150 may determine the visibility of the features 200 of the plant 140 in the first image 170 and second image 180 without an intervening first actuation in between the capture of the two images 170, 180. The processor 150 may then be further configured to dynamically set one or more parameters 190 of the one or more actuation devices 110 if the features 200 are not visible in the first and/or second images 170, 180.

In aspects, the processor may be further configured to dynamically set one or more parameters of the one or more actuation devices if the one or more features of plant are not present in the first image. For example, the parameters of a robotic arm may be set to move the leaves of plants to remove an occlusion of one or more flowers. In another example, the parameters of a fan or blower may be set generate an air flow to move the leaves of plants to remove an occlusion of one or more flowers. In a further example, the parameters of a water spray gun may be set generate a water spray to move the leaves of plants to remove an occlusion of one or more flowers. This beneficially creates a system which adjusts for difficulties in monitoring the plants, such as when portions of a plant are occluded in a captured image to be analyzed.

According to an example, the processor 150 may be further configured to detect one or more features 200 of the plant 140 in the first and second images 170, 180 of the agricultural area 120. The features 200, such as flowers, may be identified using a semantic segmentation algorithm. The algorithm may be configured distinguish portions (such as individual pixels or groupings of pixels) of the images as specific plant features 200 and all other objects. In an example, an auto-encoder model based on U-Net architecture may be used. An example of such detection is shown in FIG. 4. In FIG. 4, the upper image of the agricultural area 120 is processed such that the flowers within the image are replaced with white pixels, and all other objects within the image are replaced with black pixels.

The processor 150 may be further configured to evaluate the detected one or more features 200 of the plant 140 for one or more visual plant qualities 210. The visual plant qualities 210 may include the amount, size, and/or color of the features 200 of the plant 140. For example, FIG. 4 may be evaluated to determine that fifteen (15) flowers exist within the image. Further, the white areas of the lower image of FIG. 4 may be analyzed to determine the size of the flowers within the image. In a further example, FIG. 5 may be evaluated to determine a discoloration in the flower. The visual plant qualities 210 may include relative measurements, such as the rate of growth of the features 200 in between the capturing of the first image 170 and second image 180.

According to an example, the processor 150 may be further configured to identify the location 260 of the one or more features of the plant 140 in the first and second images 170, 180. The evaluation of the one or more features 200 of the plant 140 may be further based on the location 260 of the one or more features 200 of the plant 140. For example, the processor 150 may quantify the change in location (or movement) of the leaves of the plant 140 when an irrigation system applies a mist or when a fan applied an air flow.

The processor 150 may be further configured to dynamically set one or more parameters 190 of the one or more actuation devices 110 based on the one or more visual plant qualities 210. For example, the discoloration shown in FIG.

5 may cause the parameters 190 of an irrigation system to mist the plant 140 with a greater amount of water than previously provided. In a further example, the discoloration shown in FIG. 5 may cause the parameters 190 of a lighting system to provide the plant 140 with a greater amount of sunlight than previously provided. The parameters 190 may be set by a comparison of the visual plant qualities 210 to desired values, such as size, color, or growth rate. These desired values may be programmed using a user interface and stored in the memory 160.

According to an example, the system 100 may further include one or more environmental sensors 220 configured to capture environmental data in the agricultural area 120. The environmental sensors 220 may include one or more carbon dioxide sensors. The environmental sensors 220 may include one or more volatile organic compound (VOC) sensors. The environmental sensors 220 may include one or more temperature sensors. The environmental sensors 220 may include one or more humidity sensors. The environmental sensors 220 may include one or more microphones. The environmental sensors 220 may include one or more sensors for monitoring the quality of milk of animals fed with the plants 140. The environmental sensors 220 may include one or more electrochemical soil monitoring sensors. The electrochemical soil monitoring sensors may be configured to measure pH level, electrical conductivity, electromagnetic properties, evapotranspiration rate, moisture content, and/or nitrogen content. The electrochemical soil monitoring sensors may be placed at multiple different depths. The environmental sensors 220 may include any combination of the aforementioned systems and devices.

The system 100 may further include a user interface electrically coupled to the processor 150 wherein a user may enter environmental data. The user interface may be further configured for the user to enter data related to the schedule and/or availability of workers or consumers in the agricultural area. For example, if the system 100 requires or prefers human intervention, knowledge of a holiday would inform the system that workers are unavailable, and to proceed with alternative optimization options (such as automated lighting or irrigation adjustments).

The processor 150 may be further configured to store, via the memory 160, a first environmental dataset 230 captured in the agricultural area 120 prior to the first actuation of the one or more actuation devices 110. The first environmental dataset 230 may be captured at any appropriate point within the agricultural area 120. For example, the first environmental dataset may be captured proximate to one or more plants 140.

The processor 150 may be further configured to trigger, synchronously with the first actuation, the one or more environmental sensors 220 to capture a second environmental dataset 240 in the agricultural area 120. According to an example, the processor 150 may be further configured to trigger the one or more environmental sensors 220 to capture the second environmental dataset 120 of the agricultural area 120 within a predetermined period 270 following the first actuation.

The processor 150 may be further configured to evaluate the first and second environmental datasets 230, 240 for one or more environmental qualities 250. The environmental qualities 250 may include temperature, soil pH, carbon dioxide level, or any other quality of the agricultural probative as status of the agricultural area 120. The environmental qualities 250 may be evaluated in a similar manner as the visual plant qualities 210.

The dynamic setting of the one or more parameters 190 may be further based on the one or more environmental qualities 250. For example, the intensity of the luminaries of the lighting system may be adjusted according to the temperature of the agricultural area 120. In a further example, a robotic arm may deposit fertilizer in portions of the agricultural area 120 with low nutrient measurements.

Figure 6:
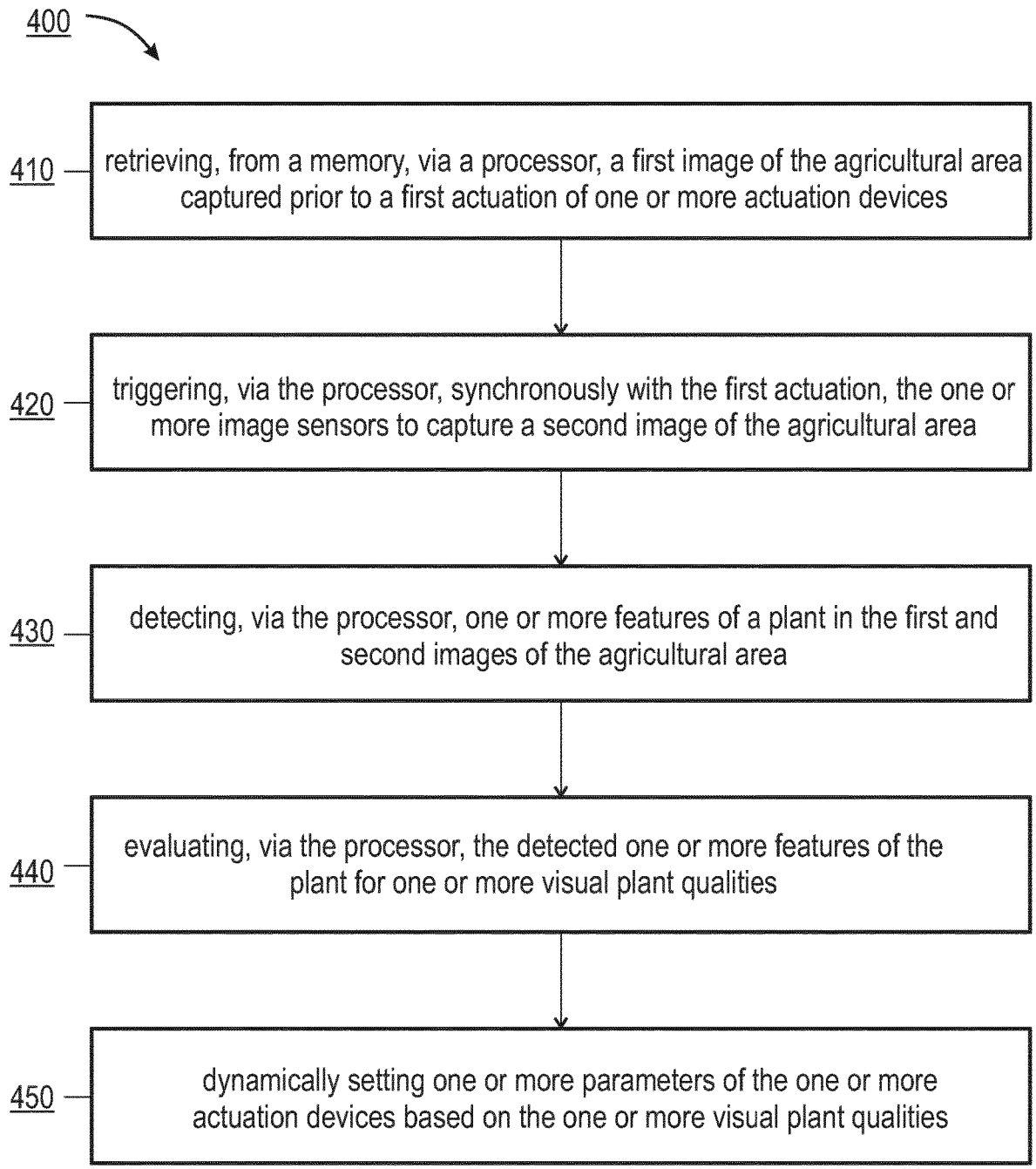
FIG. 6 is a flowchart of a method for autonomous monitoring and/or optimization of plant growth, in accordance with an example.

Referring to FIG. 6, in another aspect of the present invention, a method 400 for autonomous monitoring and/or optimization of plant growth is provided. The method 400 may include retrieving 410, from a memory, via a processor, a first image of the agricultural area captured prior to a first actuation of one or more actuation devices. The method 400 may include triggering 420, via the processor, synchronously with the first actuation, the one or more image sensors to capture a second image of the agricultural area. The method 400 may include detecting 430, via the processor, one or more features of a plant in the first and second images of the agricultural area. The method 400 may include evaluating 440, via the processor, the detected one or more features of the plant for one or more visual plant qualities.

According to an example, the method 400 may further include dynamically setting 450 one or more parameters of the one or more actuation devices based on the one or more visual plant qualities.

Figure 7:
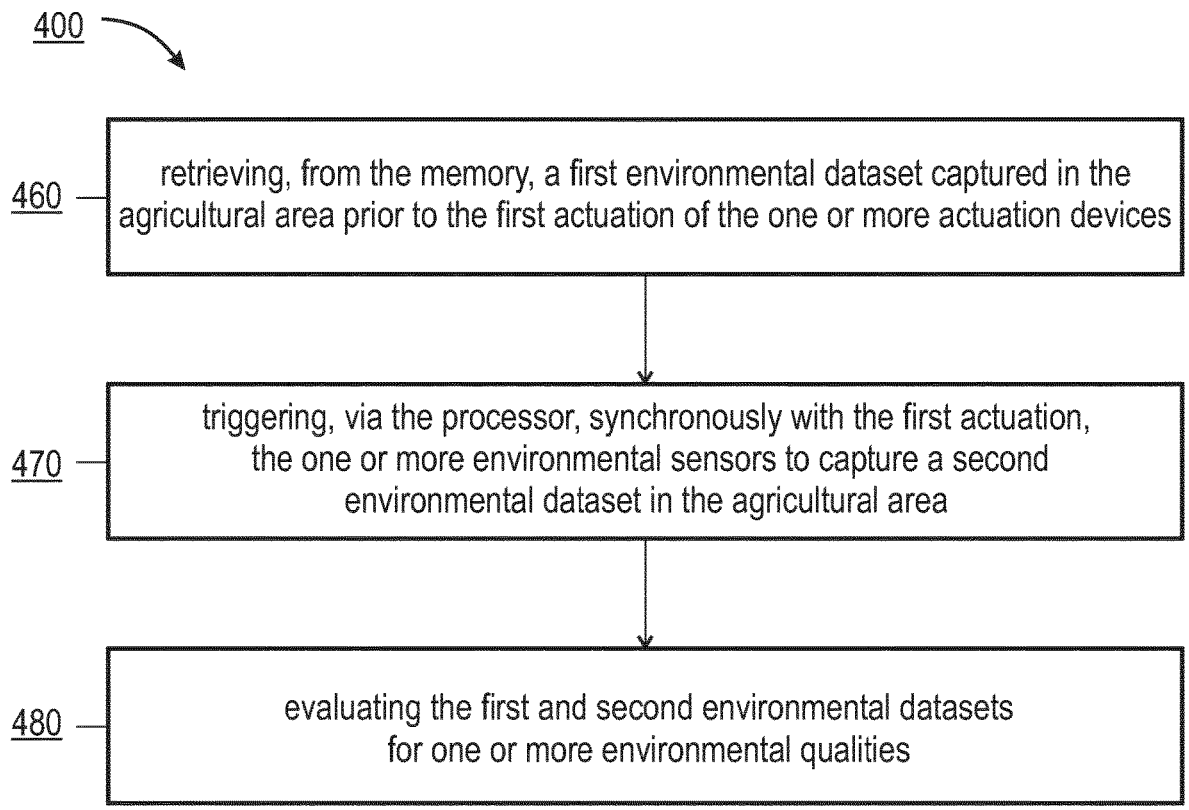
FIG. 7 is a flowchart of additional steps of a method for autonomous monitoring and/or optimization of plant growth, in accordance with a further example.

According to an example, and with reference to FIG. 7, the method 400 may further include retrieving 460, from the memory, a first environmental dataset captured in the agricultural area prior to the first actuation of the one or more actuation devices. The method 400 may further include triggering 470, via the processor, synchronously with the first actuation, the one or more environmental sensors to capture a second environmental dataset in the agricultural area. The method 400 may further include evaluating 480 the first and second environmental datasets for one or more environmental qualities. In this example, the dynamic setting of the one or more parameters of the one or more actuation devices may be further based on the one or more environmental qualities.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A system for autonomous monitoring and/or optimization of plant growth comprising:
    one or more actuation devices configured to interact with an agricultural area, wherein the actuation devices comprise one or more lighting systems;
    one or more image sensors configured to capture images of a plant in the agricultural area; and
    a processor in communication with the one or more image sensors and the one or more actuation devices, the processor configured to:
    determine if the one or more image sensors are able to capture one or more features of the plant;
    in response to determining that the image sensors are not able to capture the one or more features of the plant, dynamically set one or more parameters of the one or more actuation devices to aid in capturing images of the one or more features of the plant;
    store, via a memory, a first image of the agricultural area captured by the one or more image sensors prior to a first actuation of the one or more actuation devices and subsequent to the dynamically setting of the one or more parameters of the one or more actuation devices;
    trigger, within a predetermined period following the first actuation, the one or more image sensors to capture a second image of the agricultural area;
    detect the one or more features of the plant in the first and second images of the agricultural area;
    compare the second image to the first image to evaluate the detected one or more features of the plant for one or more visual plant qualities, wherein the one or more visual plant qualities include a color of the plant;
    in response to detecting a discoloration of the plant, dynamically resetting the one or more parameters of the one or more actuation devices based on the one or more visual plant qualities to at least cause the one or more lighting systems to provide the plant with a greater amount of light than previously provided; and
    identify a location of the one or more features of the plant in the first and second images, wherein an evaluation of the one or more features of the plant is further based on the location of the one or more features of the plant.

2. The system of claim 1, wherein the predetermined period of time is at most one minute, at most thirty seconds, or at most one second.

3. The system of claim 1, further comprising one or more environmental sensors configured to capture environmental data in the agricultural area, wherein the processor is further configured to:
    store, via the memory, a first environmental dataset captured in the agricultural area prior to the first actuation of the one or more actuation devices;
    trigger, within a predetermined period following the first actuation, the one or more environmental sensors to capture a second environmental dataset in the agricultural area; and
    evaluate the first and second environmental datasets for one or more environmental qualities.

4. The system of claim 3, wherein the dynamic resetting of the one or more parameters is further based on the environmental qualities.

5. The system of claim 3, wherein the one or more environmental sensors comprise one or more electrochemical soil monitoring sensors.

6. The system of claim 1, wherein the image sensors comprise one or more red-green-blue sensors and/or one or more multi-spectral sensors.

7. The system of claim 1, wherein the actuation devices comprise one or more irrigation systems.

8. The system of claim 1, wherein the processor is further configured to:
    adjust the one or more lighting systems such that the plant is more visible in images subsequently captured by the one or more image sensors.

9. A method for autonomous monitoring and/or optimization of plant growth, comprising:
    determining if one or more image sensors are able to capture one or more features of a plant;
    in response to determining that the image sensors are not able to capture the one or more features of the plant, dynamically setting one or more parameters of one or more actuation devices to aid in capturing images of the one or more features of the plant;
    retrieving, from a memory, via a processor, a first image of an agricultural area captured prior to a first actuation of one or more actuation devices and subsequent to the dynamically setting of the one or more parameters of the one or more actuation devices, wherein the actuation devices comprise one or more lighting systems;
    triggering, via the processor, within a predetermined period following the first actuation, the one or more image sensors to capture a second image of the agricultural area;
    detecting, via the processor, the one or more features of the plant in the first and second images of the agricultural area;
    identifying a location of the one or more features of the plant in the first and second images;
    comparing the second image to the first image for evaluating, via the processor, the detected one or more features of the plant for one or more visual plant qualities, wherein the one or more visual plant qualities include a color of the plant; and
    in response to detecting a discoloration of the plant, dynamically resetting one or more parameters of the one or more actuation devices based on the one or more visual plant qualities to at least cause the one or more lighting systems to provide the plant with a greater amount of light than previously provided,
wherein an evaluation of the one or more features of the plant is further based on the location of the one or more features of the plant.

10. The method of claim 9, further comprising dynamically resetting one or more parameters of the one or more actuation devices based on the one or more visual plant qualities.

11. The method of claim 10, further comprising:
retrieving, from the memory, a first environmental dataset captured in the agricultural area prior to the first actuation of the one or more actuation devices;
triggering, via the processor, within a predetermined period following the first actuation, one or more environmental sensors to capture a second environmental dataset in the agricultural area; and
evaluating the first and second environmental datasets for one or more environmental qualities;
wherein the dynamic resetting of the one or more parameters is further based on the environmental qualities.

12. The method of claim 9, wherein the one or more visual plant qualities are visible in the second image and not visible on the detected one or more features of the plant in the first image.

13. The method of claim 9, further comprising:
adjusting the one or more lighting systems such that the plant is more visible in images subsequently captured by the one or more image sensors.

* * * * *